(12) United States Patent
Esterson et al.

(10) Patent No.: US 6,247,736 B1
(45) Date of Patent: Jun. 19, 2001

(54) SPATULA

(75) Inventors: Robin Esterson, New York, NY (US); Kristie M. Killen, Lighthouse Point, FL (US); Donald R. Lamond, Lynbrook, NY (US); Paul Lacotta, Glen Rock, NJ (US); Anna Stern, New York, NY (US); Bill Fiebel, Clifton, NJ (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/374,419

(22) Filed: Aug. 13, 1999

(51) Int. Cl.$^7$ ....................................................... A47J 43/28
(52) U.S. Cl. .......................................................... 294/7
(58) Field of Search ........................ 294/2, 7–9, 32, 294/49; 7/110, 113, 156, 158; 15/236.01, 236.08, 236.09; 30/142, 169, 322, 324, 325, 327, 340, 342, 345; D7/688, 691, 692

(56) References Cited

U.S. PATENT DOCUMENTS

| | | | | |
|---|---|---|---|---|
| D. 108,076 | * | 1/1938 | Hess | D7/692 |
| D. 191,526 | * | 10/1961 | Marcus | D7/688 |
| D. 312,029 | * | 11/1990 | Dumbrell | D7/692 |
| 338,449 | * | 3/1886 | Teller | 294/7 |
| 4,350,445 | * | 9/1982 | Olsson | D7/688 X |
| 4,711,029 | * | 12/1987 | Somerset | 294/7 X |
| 4,877,609 | * | 10/1989 | Beck et al. | 294/7 X |
| 4,937,942 | * | 7/1990 | Skerker et al. | 294/7 X |

* cited by examiner

*Primary Examiner*—Johnny D. Cherry
(74) *Attorney, Agent, or Firm*—Kramer Levin Naftalis & Frankel, LLP.

(57) ABSTRACT

A spatula includes a handle connected to an asymmetrical flat head portion at an offset location on the flat head portion. The asymmetrical flat head portion includes a beveled perimeter edge with one side of the beveled edge including a plurality of serrations to provide a cutting capability for the flat head portion. The serrated edge of the flat head portion is further angled with respect to the handle to improve the operation of the spatula and safety of the user.

12 Claims, 4 Drawing Sheets

SPATULA

FIELD OF THE INVENTION

The present invention relates to a spatula, more particularly a spatula used for outdoor cooking.

BACKGROUND INVENTION

Spatulas are used for cooking in many environments including grilling, whether outdoor grilling over a fire or indoor cooking on a griddle surface. Notwithstanding the pervasive use of the spatula as a necessary cooking tool, prior art spatulas are not well adapted to provide comfort and ease of use in many cooking situations. For example, conventional spatulas include a flat head portion used for manipulating foodstuffs that is attached to a handle portion that is generally centered on the head portion. Such an arrangement is not optimal for many uses of the spatula, such as for using the spatula to cut foodstuffs as well as move them.

SUMMARY OF THE INVENTION

According to an exemplary embodiment of the present invention, a spatula includes a handle connected to an asymmetrical flat head portion at an offset location on the flat head portion. The asymmetrical flat head portion includes a beveled perimeter edge with one side of the beveled edge including a plurality of serrations to provide a cutting capability for the flat head portion. The serrated edge of the flat head portion is further angled with respect to the handle to improve the operation of the spatula and safety of the user.

DETAILED DESCRIPTION

Figure 1:
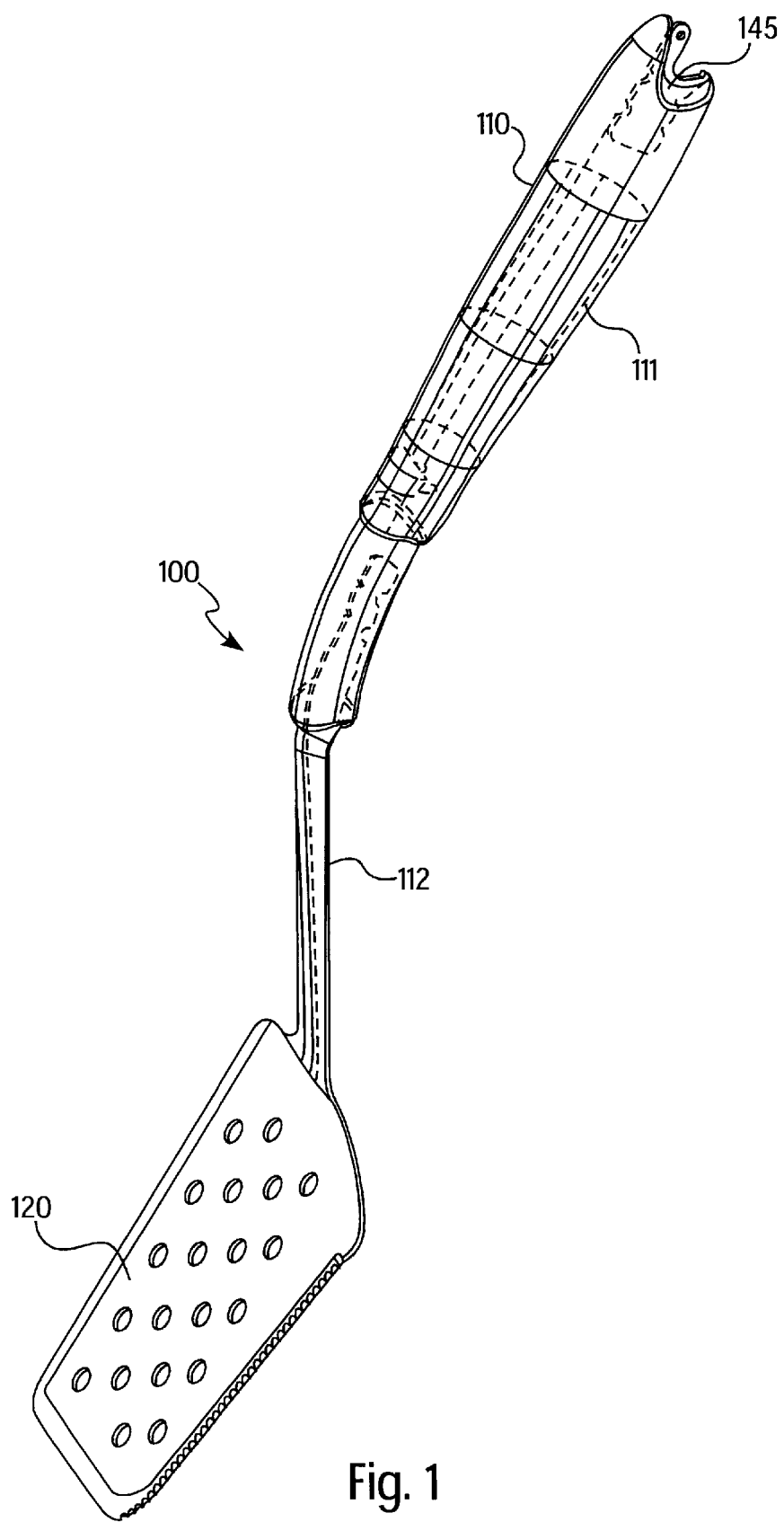
FIG. 1 illustrates an exemplary spatula according to an embodiment of the present invention.
Figure 5:
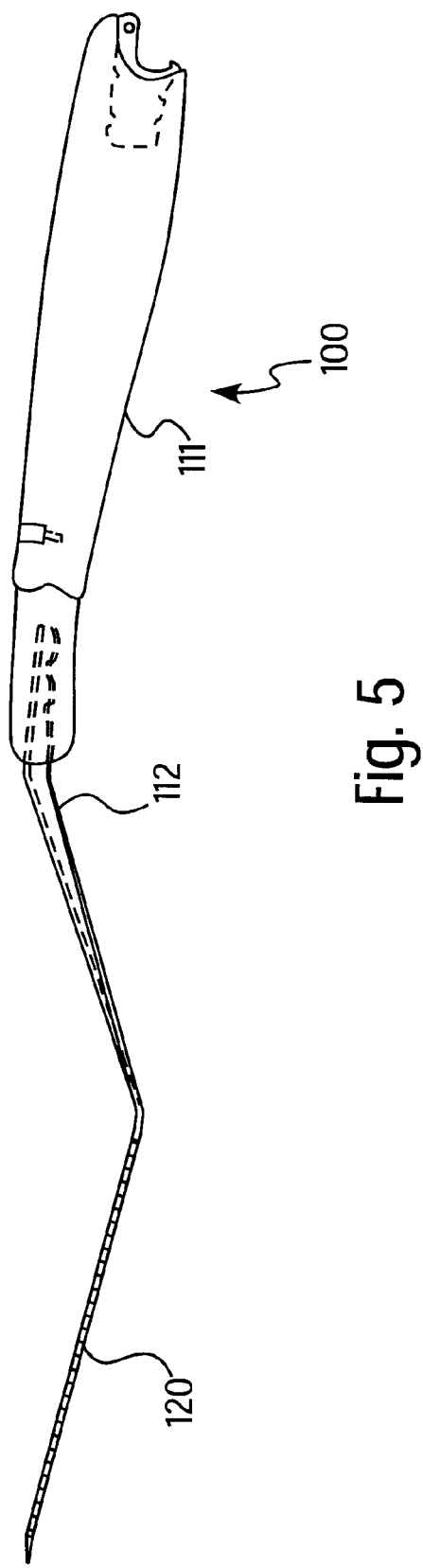
FIG. 5 illustrates a side view of an exemplary spatula according to an embodiment of the present invention.

FIG. 1 illustrates an exemplary spatula 100 according to an embodiment of the present invention. Spatula 100 includes handle portion 110 and head portion 120. Handle portion 110 includes, for example, gripping portion 111 disposed towards an upper end of handle portion 110 and a neck portion 112 disposed at a lower end of handle portion 110. As shown in FIG. 5, head portion 120 is disposed lower relative to gripping portion 111 due to, for example, the angled form of neck portion 112.

Gripping portion 111 may be formed, for example, as a separate piece. For example, gripping portion 111 may include an inner core of relatively hard material, such as polypropylene, with a softer, malleable outer covering, such as an overmolded polypropylene elastomer to provide comfortable gripping of the spatula 100 by a user. As is known in the art, the inner core of gripping portion 111 may be formed by injection molding using a two position mold with a second set of molds being used to form the outer covering over the inner core. Other suitable manufacturing methods may be used. Alternatively, gripping portion 111 may have unitary construction of any suitable heat-tolerant material.

Figure 2:
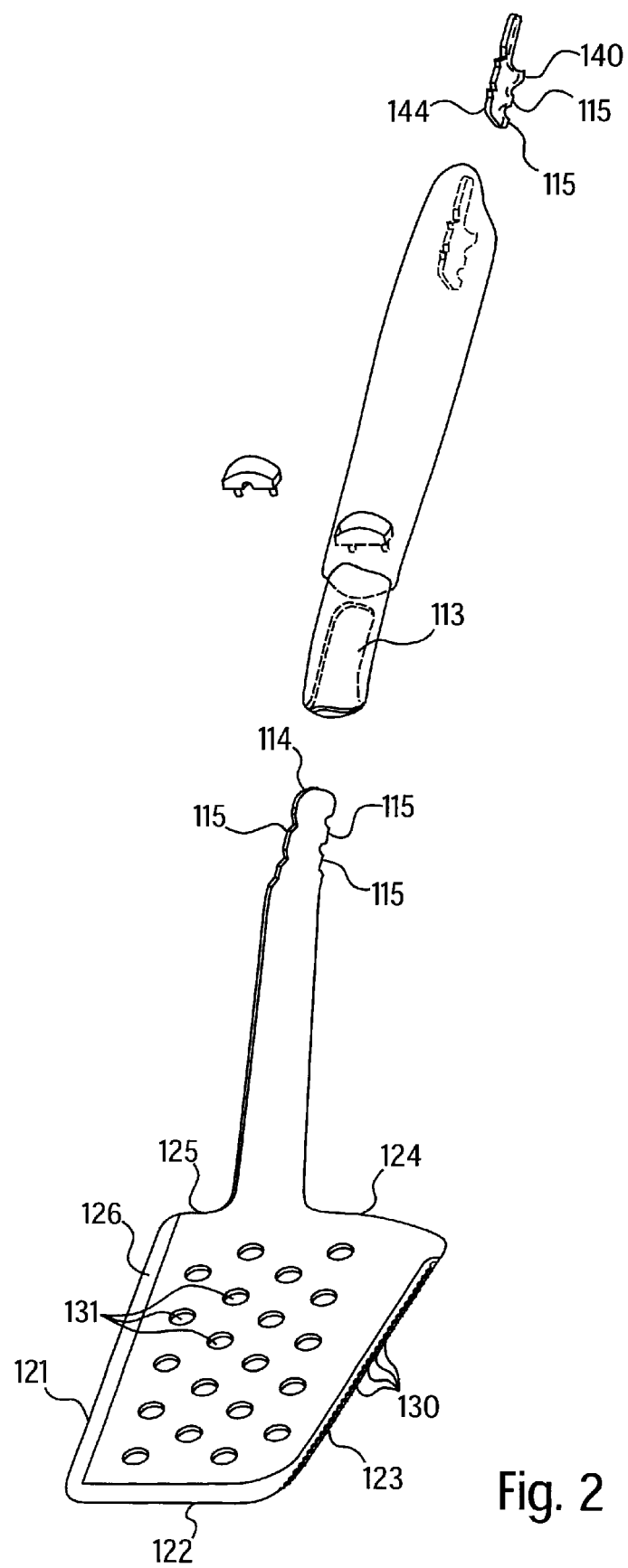
FIG. 2 illustrates an exemplary exploded view of a spatula according to an embodiment of the present invention.

Neck portion 112 connects gripping portion 111 to head portion 120. As illustrated in FIG. 1 and 2, neck portion 112 may be formed integral with head portion 120, although in alternative embodiments of the present invention, neck portion 112 and gripping portion 111 also could have unitary (e.g., integral) construction. Neck portion 112 may be formed of, for example, stainless steel, plated steel, aluminum or heat treated plastic. As illustrated in FIG. 2, neck portion 112 may connect to gripping portion 111 via a press fit into a lower end of gripping portion 111. For example, the lower end of gripping portion 111 may include a slit 113 into which an end portion 114 of neck portion 112 may be forced with barbs 115 on end portion 114 engaging the walls of opening 113, thereby maintaining the connection of neck portion 112 and gripping portion 111. Other suitable means for connecting neck portion 112 and gripping portion 111 may be used, such as screws, welds or integral construction. As illustrated in FIG. 5, neck portion 112 may have an angled construction, such as end portion 114 being disposed at an angle with respect to the remainder of neck portion 112.

Head portion 120 of spatula 100 is disposed at an end of neck portion 112. Head portion may be formed, for example, integral with neck portion 112 and may be formed of stainless steel, plated steel, aluminum or heat treated plastic. As shown in FIGS. 1 and 5, neck portion 112 is, for example, angled between gripping portion 111 and head portion 120 so that head portion 120 is disposed lower relative to gripping portion 112. Head portion 120 includes, for example, an asymmetrical shape including first edge 121, second edge 122, third edge 123, fourth edge 124 and fifth edge 125. First, second and third edges 121, 122, 123 include, for example, a beveled edge portion 126 extending downward from a top surface of head portion 120. As illustrated in FIGS. 1 and 2, according to an exemplary embodiment of the present invention, neck portion 112 does not join head portion 120 at a central position, but rather neck portion 112 is offset with respect to the head portion 120. For example, neck portion 112 joins head portion 120 at a point closer to first edge 121 than to third edge 123, illustrated by fourth edge 124 being wider than fifth edge 125.

In addition, third edge 123 includes a plurality of serrations 130 to provide, for example, a cutting surface. As a result of the offset placement of the connection of neck portion 112 to head portion 120 and the serrated third edge 123, better leverage is provided for the use of spatula 100 as a cutting tool. For example, the serrated edge 123 is positioned further away from the gripping portion 111 than if the neck portion 112 joined head portion 120 at the center of the rear edge or was equally disposed between first edge 121 and third edge 123. In an alternative embodiment, spatula 100 can be formed with neck portion 112 connecting to head portion 120 closer to third edge 123 with serrations 130 being on first edge 121. Such a configuration could accommodate, for example, left hand users of spatula 100.

According to an embodiment of the present invention, the operation of the spatula can be further improved by additional angling of the third edge 123. For example, as illustrated in FIG. 2, the rear portion of third edge 123 (e.g., approaching neck portion 112) is angled away from handle 110. In contrast, for example, first edge 121 runs substantially parallel to handle 110 although first edge 121 also could angle away from handle 110. The additional angling of third edge 123 in combination with the serrations 130 provide improved operation of the spatula 100 over prior art spatulas. For example, in addition to the additional leverage available to the user from the offset handle arrangement, the asymmetrical shape including angled and serrated edge 123 of the head portion 120 according to an exemplary embodiment of the present invention provides additional clearance to keep the hand of a user away from the heat of a cooking surface when using the serrated edge 123.

According to another embodiment of the present invention, head portion 120 includes a plurality of openings 131 disposed therethrough to allow, for example, grease and other liquids to pass through the head portion 120. In addition, the openings 131 provide a pattern that can be embossed on malleable foodstuffs, such as ground meat, and also provide for browning of food in the resultant pattern. In addition to openings 131, any desired pattern of openings may be used as well as varied opening shapes, such as slits.

Figure 3:
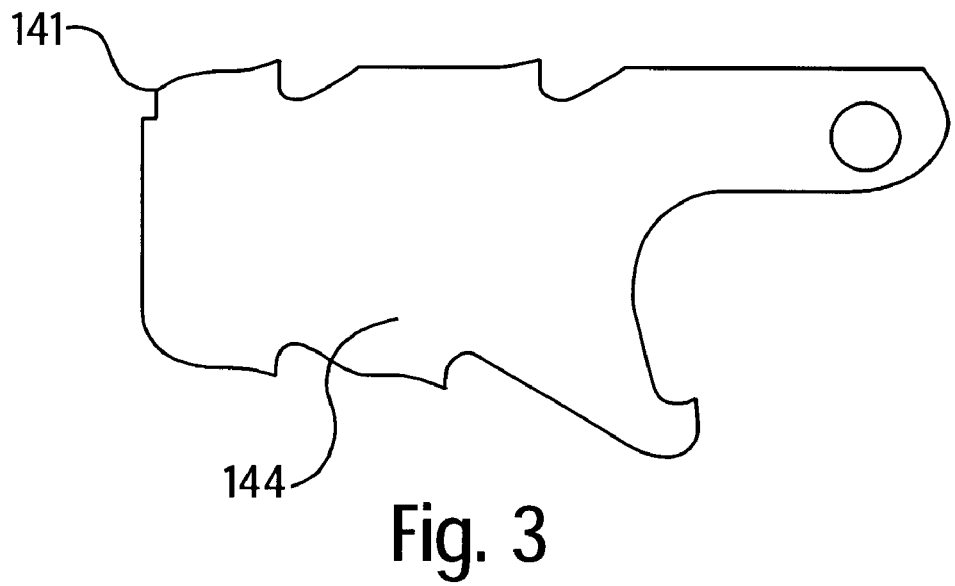
FIG. 3 illustrates an exemplary insert according to an embodiment of the present invention.
Figure 4:
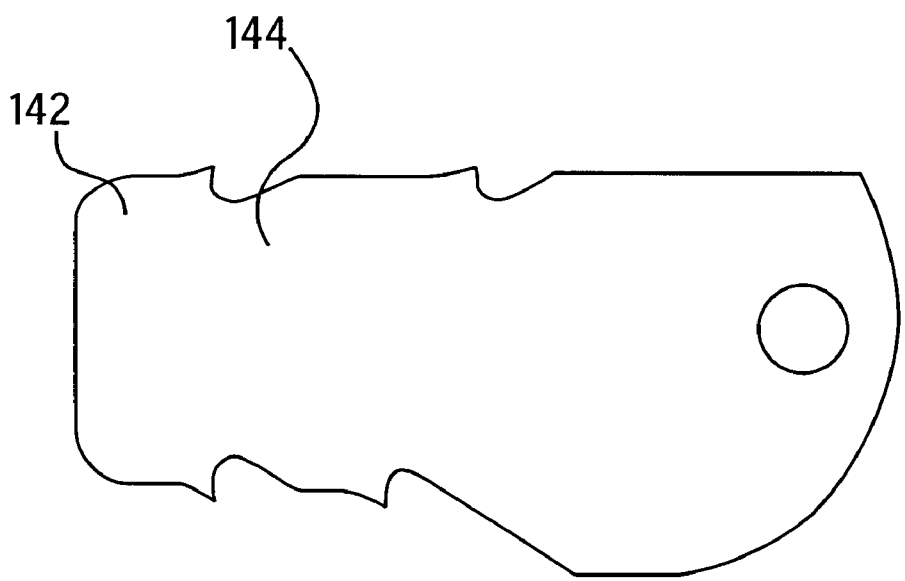
FIG. 4 illustrates another exemplary insert according to an embodiment of the present invention.

An end portion of handle 110 may include, for example, an insert 140. FIGS. 3 and 4 illustrate possible inserts 140, such as bottle opener insert 141 and hanging insert 142. Similar to end portion 114 of neck portion 112, insert 140 connects to handle 110 via, for example, a press fit into an end of handle 110. For example, the end of handle 110 may include a slit 145 into which an end portion 144 of insert 140 (or inserts 141, 142) may be forced with barbs 115 on end portion 144 engaging the walls of opening 145, thereby maintaining the connection of insert 140 and handle 110.

What is claimed is:

1. A spatula, comprising;
   a handle; and
   a substantially flat head portion adjoining a lower end of the handle, wherein the head portion includes a first side edge and a second side edge, each of the first side edge and the second side edge including a downwardly beveled perimeter, the handle adjoining the head portion at an offset location disposed towards the first side edge, the second side edge forming an oblique angle with respect to the handle and the second side edge including a plurality of serrations.

2. The spatula according to claim 1, wherein the flat head portion includes a plurality of openings therethrough.

3. The spatula according to claim 1, wherein the handle includes a gripping portion disposed adjacent a neck portion.

4. The spatula according to claim 3, wherein the gripping portion and the neck portion are connected via a press fit.

5. The spatula according to claim 3, wherein the gripping portion and the neck portion are integrally formed.

6. The spatula according to claim 3, wherein the neck portion and the flat head portion are integrally formed.

7. The spatula according to claim 6, wherein the neck portion and the flat head portion are integrally formed of stainless steel.

8. The spatula according to claim 1, wherein an upper portion of the handle includes an outer covering of a malleable material.

9. The spatula according to claim 1, wherein an end portion of the handle includes an insert.

10. The spatula according to claim 9, wherein the insert is connected to the handle via a press fit.

11. The spatula according to claim 9, wherein the insert includes one of a hanging insert and a bottle opener.

12. A spatula, comprising:
    a gripping element;
    a neck element connected to the gripping element, an upper portion of the neck element forming an oblique angle with respect to a lower portion of the neck element;
    an asymmetrical head connected to the lower portion of the neck element at an offset location, the offset location being disposed towards a predetermined edge of the asymmetrical head, an edge opposite the predetermined edge including a plurality of serrations and forming an oblique angle with respect to a longitudinal axis of the neck element.

* * * * *